B. W. KADEL & J. A. PILCHER.
RAILWAY CAR.
APPLICATION FILED JAN. 17, 1916.

1,196,462.

Patented Aug. 29, 1916.
2 SHEETS—SHEET 1.

Witnesses
A. K. Simmons.
Earl H. Fisher.

Inventors
B. W. Kadel
John A. Pilcher.

By

Attorney

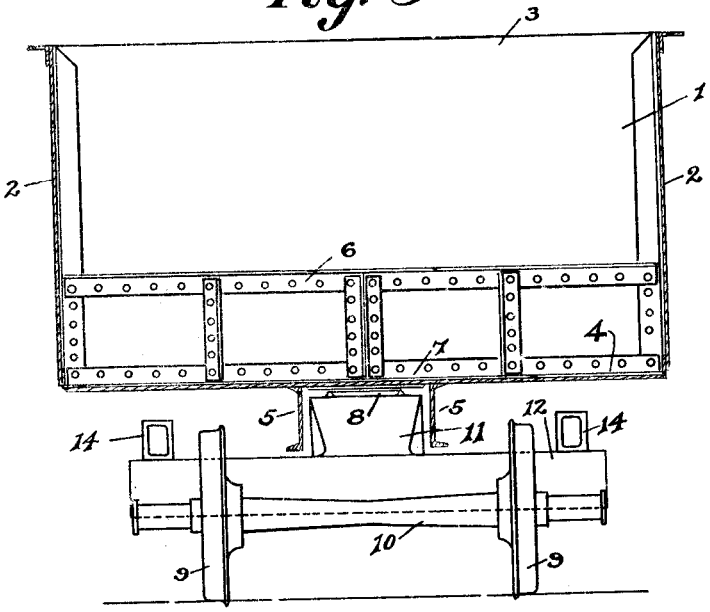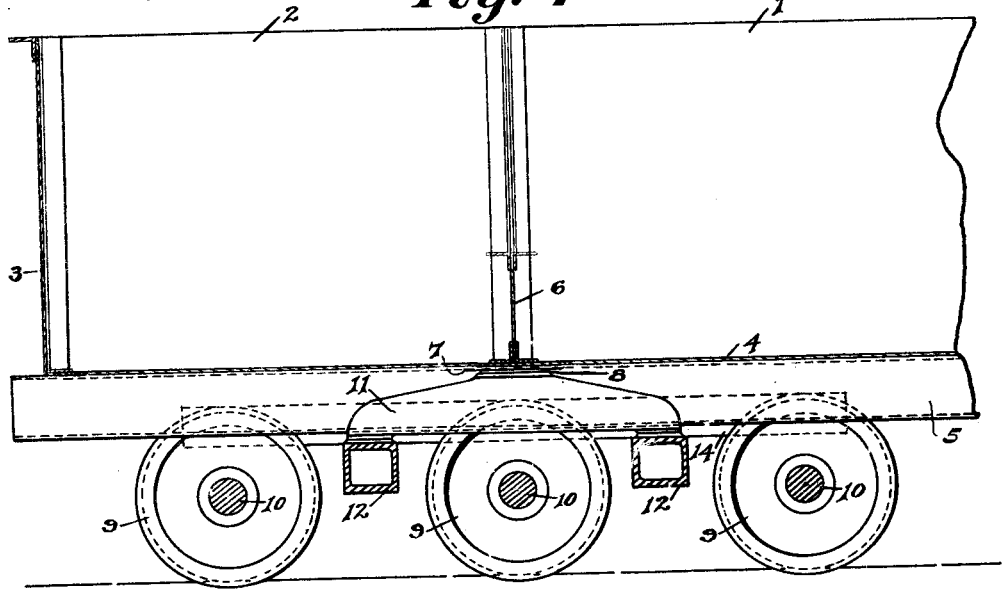

UNITED STATES PATENT OFFICE.

BYERS W. KADEL AND JOHN A. PILCHER, OF ROANOKE, VIRGINIA.

RAILWAY-CAR.

1,196,462.

Specification of Letters Patent. Patented Aug. 29, 1916.

Application filed January 17, 1916. Serial No. 72,394.

*To all whom it may concern:*

Be it known that we, BYERS W. KADEL and JOHN A. PILCHER, citizens of the United States, residing at Roanoke, in the county of Roanoke and State of Virginia, have invented certain new and useful Improvements in Railway-Cars, of which the following is a specification.

This invention relates to railway car construction and the principal object thereof is to provide an arrangement of car body and trucks in which the various members are so formed and disposed as to utilize the space beneath the car body to the best advantage and to coöperate with each other to form improvements generally in car body and truck construction.

With such objects in view, the invention consists in the formation, combination and arrangement of the various parts as herein described and as particularly pointed out in the appended claims.

Figure 1:
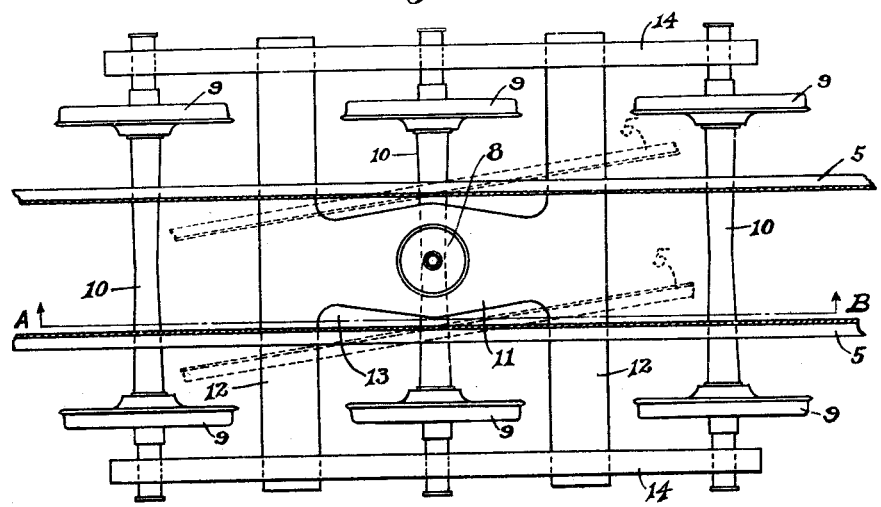
Figure 2:
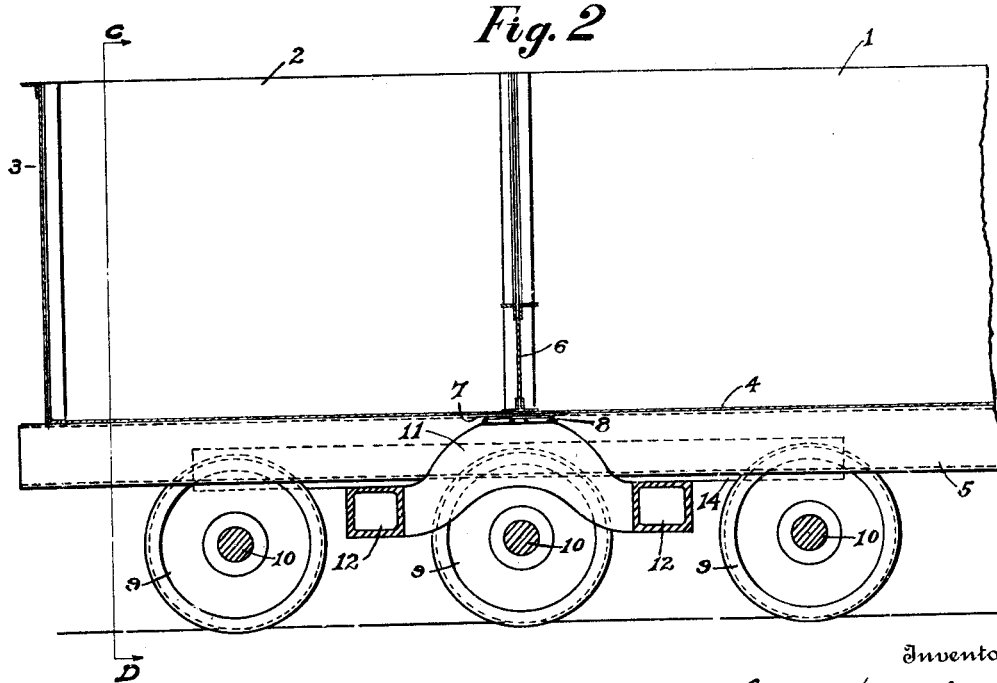

In the accompanying drawings, Figure 1 is a horizontal, sectional view of a portion of a car constructed in accordance with the present invention and showing in plan view a truck beneath the same, the section being taken on a horizontal line through the center sills of the car and below the car floor. Fig. 2 is a longitudinal, vertical, sectional view through the same car body and truck, this section being taken on the line A B of Fig. 1. Fig. 3 is a transverse, vertical section of the same, taken on the line C D of Fig. 2.
Fig. 4 is a view similar to Fig. 2 showing a slightly modified form of truck bolster members.

Referring now to these drawings which show a preferred embodiment of the invention and wherein like parts are similarly designated, 1 represents the body of a car of the open gondola type. This car comprises side walls 2, end walls 3, and floor or bottom 4. Beneath the floor of the car is provided a pair of longitudinally-disposed center sills or draft members 5 which extend from end to end of the car. These center sills are located in spaced relationship with each other transversely of the car and are supplied primarily to withstand the draft forces, the interval between these sills serving at the ends as a draft gear pocket. Extending from side wall to side wall of the car body, and located over the center sills and above the floor of the car, at each end, is a transverse body bolster or girder member 6 which is located within the cavity of the car body and serves to transfer loads from the car sides to a point where they may be transferred to the truck.

The trucks each comprise the customary wheels 9 and axles 10 and are further provided with any approved form of load-supporting and load equalizing means. An essential portion of the load-supporting means, however, consists of the longitudinally disposed beam member 11 which is disposed between the car floor and the truck axles and occupies the space between the center sills 5. This beam member is preferably supported in turn upon the two transverse beam members 12 which pass with some clearance, under the center sills 5 so as to allow the turning of the truck under the car body on curves, and these members 11 and 12 form a portion of the means for transferring the load from an end of the car body to the rail.

For a load-receiving point, the longitudinal beam member 11 is in the present embodiment provided with a bottom center bearing plate 8 near the center of its length and on its upper surface and this coöperates with a similar top center plate 7 disposed immediately under the car body bolster 6 at the center line of the car. These two plates coöperate to form a truck-swiveling point and load-applying point. It has been customary in such cars to locate this center bearing plate 7 beneath the car center sills, but as a portion of the present invention this center bearing plate is located up against the car floor between the center sills and at a point where it will react directly against the body bolster 6 without the intervention of the center sills. Thus is provided considerable more depth for the beam member 11 over the middle truck axle.

The longitudinal beam member 11 is preferably arched up over the middle axle and terminates at its ends in the integral, transverse member 12, as shown in Fig. 2, although these members may be separate pieces as shown in Fig. 4. It is necessary that some lateral clearance be left between the ends of the longitudinal beam member and the adjacent center sill, as at 13, in order that these parts may not foul each other when passing around curves, at the point where the longitudinal member joins the transverse members.

The transverse members 12 are shown in the drawings as supported by truck side members 14 which are supported in turn upon the axles 10, the supporting means for these side members not being shown in the drawings inasmuch as any of the familiar oil box and equalizer arrangements will serve for this purpose and such are well known in the art.

Thus has been provided an arrangement of car body and truck members wherein the parts are so disposed as to make the best use of the available space beneath the car body and the members so disposed as to obtain the maximum conditions of strength for the various parts.

Having thus described our invention we claim:

1. A railway car having a pair of longitudinally disposed center sills located in spaced relationship with each other transversely of the car, the said car having further a supporting truck at each end and these trucks each having a bolster or load supporting member disposed longitudinally of the car and within the space between the said center sills and having means on the same for receiving the load from the car body.

2. A railway car having a pair of longitudinally disposed center sills located in spaced relationship with each other transversely of the car, the said car having further a supporting truck at each end, these trucks comprising a plurality of wheels and axles and load supporting and equalizing means, the said load supporting means embodying a longitudinally extending beam member which is arched over the middle one of the said truck axles and disposed within the space between the said center sills.

3. A railway car having a body with a floor, said car being provided with a pair of longitudinally disposed center sills located in spaced relationship with each other transversely of the car and beneath the car floor, the said car being provided further with a supporting truck at each end and these trucks each embodying a longitudinally disposed load supporting member having a center bearing or load receiving plate thereon, said load supporting member being disposed in the space between the said center sills, and a center bearing plate on each end of the car body between the said center sills and immediately beneath the said car floor, the center bearing plates on car body and trucks being adapted to coöperate with each other to form supporting points for the said car body on its trucks.

4. A railway car having a body comprising side and end walls and a floor, said car being provided with a pair of longitudinally disposed center sills located in spaced relationship with each other transversely of the car and beneath the car floor, a single transverse body bolster at each end of the said car body extending from side wall to side wall and disposed over the said center sills, above the car floor and within the cavity of the car body, the said car being provided further with a supporting truck at each end and these trucks each embodying a longitudinally disposed load supporting member having a center bearing or load receiving plate thereon, said load supporting member being disposed in the space between the said center sills, and a center bearing plate on each end of the car body between the said center sills and immediately beneath the said transverse body bolster, the center bearing plates on car body and trucks being adapted to coöperate with each other to form supporting points for the said car body on its trucks.

5. A railway car having a body with a floor, said car being provided with a pair of longitudinally disposed center sills located in spaced relationship with each other transversely of the car and beneath the car floor, the said car being provided further with a supporting truck at each end and these trucks each embodying a longitudinally disposed load-supporting member having means on the same for receiving the load from the car body, said load supporting member being disposed in the space between the said center sills, and means on the car body adapted to rest on the said load-supporting member of the truck and coöperate therewith to form load-supporting points and truck-swiveling means.

6. A railway car having a pair of longitudinally disposed center sills located in spaced relationship with each other transversely of the car, the said car having further a supporting truck at each end and these trucks each having a longitudinally disposed bolster or load supporting member and a pair of transversely disposed bolster or load supporting members, said longitudinal bolster member being disposed within the space between the said center sills and having means on the same for receiving the load from the car body, the said transverse bolster members being formed and disposed to support the ends of the longitudinal bolster member and passing beneath the said center sills.

7. A railway car having a pair of longitudinally disposed center sills located in spaced relationship with each other transversely of the car, the said car having further a supporting truck at each end and these trucks each having a longitudinally disposed bolster or load supporting member and a pair of transversely disposed bolster or load supporting members, said longitudinal bolster member being disposed within the space between the said center sills, the said transverse bolster members being formed and disposed to support the ends of the longitudinal bolster members and passing beneath the said center sills, the said longitudinal bolster having a bottom center bearing plate near its center and being of less width at its ends than the space between the said center sills, the said car being provided with a top center bearing plate between the said center sills and beneath the car floor, the same being adapted to coöperate with the said bottom center plate to form a load-supporting and truck-swiveling point.

8. A railway car having a pair of longitudinally disposed center sills located in spaced relationship with each other transversely of the car, the said car having further a supporting truck at each end, these trucks comprising a plurality of wheels and axles and load-supporting and equalizing means, the said load-supporting means embodying a longitudinally extending beam member which is arched over the middle one of the said truck axles and disposed within the space between the said center sills, the end of the same being drooped to a point below the said center sills and terminating in a transverse beam member which passes under the said center sills.

9. A railway car having a body with a floor, said car being provided further with a pair of longitudinally disposed center sills located in spaced relationship with each other transversely of the car and beneath the car floor, the said car being provided further with a supporting truck at each end and these trucks each embodying a longitudinally disposed load-supporting member having means in connection with the same for receiving the load from the car body, said load supporting member being disposed in the space between the said center sill, and means on the car body adapted to apply the load of the same to the said load-supporting member of the truck.

10. A railway car having a pair of center sills extending longitudinally of the car and disposed in spaced relationship with each other transversely of the car, the said car being provided further with a supporting truck comprising the customary wheels, axles and load-supporting and equalizing means, the said load-supporting means embodying a beam member which extends longitudinally of the car and is disposed in the space between the said center sills, the said beam member being provided with means for receiving the car body load and being in rotatable relationship in a horizontal plane with the said center sills.

In testimony whereof we affix our signatures in presence of two witnesses.

B. W. KADEL.
JOHN A. PILCHER.

Witnesses:
A. K. SIMMONS,
G. F. KIMMERLING.